March 10, 1964 A. SCHMECKENBECHER 3,124,490

VARIABLE AXIS MAGNETIC FILMS

Filed June 30, 1960

LOW FIELD — EASY DIRECTION | HARD DIRECTION; HIGH FIELD — EASY DIRECTION | HARD DIRECTION

ANISTROPIC

ISOTROPIC

PARTLY ISOTROPIC

VARIABLE AXIS BEFORE HIGH FIELD

VARIABLE AXIS AFTER HIGH FIELD

INVENTOR.
ARNOLD SCHMECKENBECHER
BY Robert Ames Norton
ATTORNEY

United States Patent Office 3,124,490
Patented Mar. 10, 1964

3,124,490

VARIABLE AXIS MAGNETIC FILMS

Arnold Schmeckenbecher, Elkins Park, Pa., assignor to Sperry Rand Corporation, New York, N.Y., a corporation of Delaware Filed June 30, 1960, Ser. No. 40,008
9 Claims. (Cl. 148—31.55)

This invention relates to new iron and nickel containing magnetic films having a variable magnetization axis and to methods of preparing them.

Thin films of magnetic materials such as nickel, iron and particularly alloys of nickel and iron, and with or without molybdenum, are used extensively for information storage devices such as are used in computer logic circuits and the like. Such films have been prepared in the past by vapor deposition, electroplating, and other methods, and are of three general types, anisotropic, isotropic, and partly isotropic. It is with improved films of the last type that the present invention deals. The anisotropic and partially isotropic films have definite axes at right angles to each other which behave quite differently under an alternating magnetic field. This makes possible an additional parameter for components of computer logic circuits. It is desirable to have more parameters as this makes possible a more simple arrangement of certain logic circuits. In addition to the ordinary parameters the present invention adds one, and in some cases two additional parameters.

The first parameter is referred to as variable axis. Ordinary films of magnetic material retain the characteristics of easy and hard directions of magnetization about the two axes at right angles to each other. Films of the present invention, however, under an alternating magnetic field fairly rapidly reverse their directions of magnetization, the easy becoming the hard, and the hard the easy. This introduces a new parameter and makes the films useful as basic components of certain new types of computer logic circuits. Most of the films of the present invention show this property which is referred in the present specification and claims as "variable axis."

In addition some of the films show an additional property, namely a magnetization threshold. Most of these films also have a variable axis though a few have been produced with variable threshold only. Every film has a certain threshold in magnetic drive field which in a given direction is just strong enough to cause magnetic induction. It can be measured by noting an opening of the hysteresis loop. In some of the films of the present invention this threshold can be varied by the application of a high field pulse. After application of the high field pulse the threshold of magnetization is increased. Thus an additional parameter is provided, depending on whether or not a given film has been subjected previously to a high field pulse. The magnitudes will vary with different films of the present invention, but a typical instance will illustrate. In a given film in the easy magnetization direction there may be no significant magnetic induction below 1.5 oersteds. Between 1.5 and 3.0 oersteds the induction begins which is shown by opening of the hysteresis loop and the loop is opened still further under fields above 3.0 oersteds. If a previous high field pulse has been applied, for example 10 oersteds, the response below 1.5 oersteds is the same but in the region between 1.5 and 3.0 oersteds there is no magnetic induction and the hysteresis loop does not open up. The threshold is then at about 3.0 oersteds. Application of a high field pulse changes the threshold field. This adds an additional parameter and makes the films particularly useful in new improved types of logic circuits which have been designed to utilize this additional parameter. The above example is merely typical, the exact values for thresholds varying from film to film.

Essentially the films of the present invention acquire their new properties by the association of a small amount of a so-called interstitial element which is capable of occupying positions in the interstices in the film lattice. Of the interstitial elements carbon is the most important but other elements having affinity for the interstices of the particular alloy in the film may be used, notably nitrogen. Other interstitial elements such as boron, phosphorus, sulfur and the like, are broadly included in the present invention, but carbon and nitrogen are preferred, particularly carbon.

The mechanisms by which axis variation and threshold variation take place have not been conclusively proven. Probable mechanisms which may serve to clarify the concepts will be given, but it should be understood that the invention is not limited to these theories since they have not been rigorously proven.

It seems probable that the interstitial impurity atoms remain on preferred sites in the metal lattice determined by certain effects of the spontaneous magnetization of the ferromagnetic film or by magnetic fields previously applied to the film. When a sufficiently high magnetic field is applied in another direction parallel to the plane of the film the magnetic moment of the film is turned into this direction. Magnetostrictive stresses then favor a wandering of the interstitial elements to new sites causing a shift of the easy and hard directions of the film. There is strong evidence that this mechanism or something similar may be involved, for the change in axis is not abrupt as would be the case if a lattice configuration were suddenly shifted. On the contrary, it requires a number of cycles of the strong field to gradually shift the axis. The time constant is of the order of a fair sized fraction of a second. When examined oscilloscopically with a series of sequence photographs it will be seen that each cycle of the strong magnetic field opens the hysteresis loop in the hard direction more and more, until after a number of cycles the opening is complete, and now it will be found that the other direction at right angles which formerly was the easy direction has become a hard one and under moderate fields will not show a hysteresis loop. This fairly large time constant is only explicable by a phenomenon which takes place gradually.

The mechanism by which the variation of the threshold takes place may be somewhat different. It also has not been proven conclusively.

There is evidence that the interstitial element, such as carbon, not only is present interstitially in the lattice, but that in addition separate metal carbide phases of different crystal structure are present in the metal alloy film. It is conceivable that such carbide phases are dispersed in the metal alloy film in such a way that areas of the metal alloy film are separated from other parts of the film by the carbide phase, and that such areas are so small as not to favor the setting up of domain walls. If such single domain areas are not spherical or disc shaped, they will have a shape anisotropy in the plane of the film, that is, they will have preferred directions of magnetization, which in turn would influence the magnetization of areas of the film close to the single domain areas. In certain such areas, after application of a high field pulse, the nucleation of new domain walls would be more difficult, leading to an increase of the threshold field in a manner described above.

The explanations which are set out above, and which involve the diffusion of the interstitial elements from one set of sites to another, and the presence of single ferromagnetic domain areas separated by carbide etc. phases provide an adequate explanation for the behavior. It is, therefore, believed that they are probably the factors, or at least major factors. However, as is pointed out above the invention is not limited to these theories of axis and threshold shifts which are new and entirely unexpected properties of the films of the present invention.

The films of the present invention do not differ substantially in their thickness range from fixed axis films which have been produced before. In general the thickness range is from 500 to 10,000 A. Optimum thickness is not sharply critical. The limits of percentage of interstitial elements will vary somewhat, but are in general in the range from .5% to 4.5%.

It should be understood that the new property of axis variation under the influence of a strong magnetic field is effective at room temperatures. In ordinary magnetic films the phenomenon of axis variation under strong magnetic fields has been observed but at only very high temperatures, and is of course of no practical utility in instruments which must be operated under ordinary temperature conditions. Therefore in the specification and claims when reference is made to variable axis or variable threshold this refers to the property at ordinary temperatures, and not at high temperatures.

The introduction of the interstitial elements may be effected in various ways. Thus, for example, an already prepared thin film of nickel-iron or nickel-iron-molybdenum alloy, may be treated at elevated temperatures to introduce carbon, nitrogen and the like. The product aspect of the present invention includes films regardless of the method by which they are prepared. However, for films containing carbon or nitrogen the invention includes an improved process in which the interstitial element is introduced during formation of the film. In the case of carbon-containing films this is best done by decomposing carbonyls of iron, nickel etc. on a suitably heated substrate, for example glass. The carbonyls must be applied in a particular manner. There must be a slow flow of the carbonyls and mixed with a suitable carrier gas such as hydrogen, nitrogen, carbon monoxide, noble gases and the like. The dilution must be sufficiently great so that a slow flow is possible. Time is a very important factor and decomposition of iron or nickel carbonyl in a fast jet at high temperature before they strike the substrate will not yield films having the desirable properties of the present invention.

Neither time, rate of flow, nor temperature can be specified individually as they interact. In general lower temperatures require longer time and slower flow, preferably of suitably diluted gas. Higher temperatures permit more rapid flow and shorter times. The ranges for these factors will therefore be given for each factor alone, it being understood that not all quantities can be used with all quantities of the others. Starting with temperature useful films are not obtained below 100° C., and preferably not above about 350° C. In general the best films are obtained between temperatures of 150 and 300° C. Similarly times can vary from about 30 seconds for 300° C. and above, at least about three minutes for 250° C., four minutes for 200° C., and ten minutes for 150° C. There is no sharp upper limit but times beyond sixty minutes are normally not practical.

The concentration of metal carbonyl vapor in the inert or reducing gas carrier may be from 0.5 to 5 percent by volume, and flow rate from .5 ml. to 250 ml. per minute.

Film deposition appears to proceed in thin layers. Evidently some metal is formed which acts as a catalyst for further decomposition of the carbonyl until a carbon-rich layer is formed and then some more metal is produced. Carbon contents are, of course, average, and as has been pointed out above, there may well be migration of carbon atoms. At low temperature the rate of reaction is slow, and it is not only necessary to use long times but more dilute gases are preferable in order to avoid wasting carbonyl.

The invention will be described in greater detail in conjunction with the examples in which the parts are by weight unless otherwise specified and in conjunction with the drawing in which.

Figure 1:
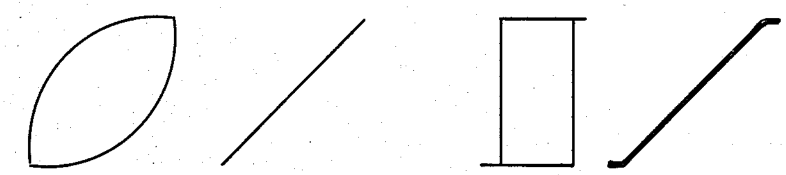
FIG. 1 illustrates a series of hysteresis loops for anisotropic material.
Figure 2:
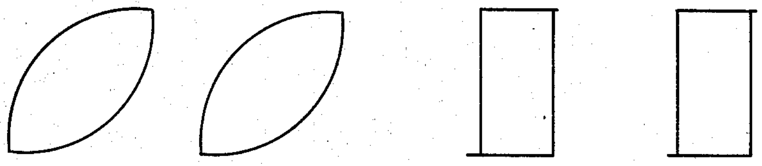
FIG. 2 shows a similar series for isotropic material.
Figure 3:
FIG. 3 shows a series of loops for partly isotropic material.
Figure 4:
FIG. 4 shows low field hysteresis loops of a variable axis film.
Figure 5:
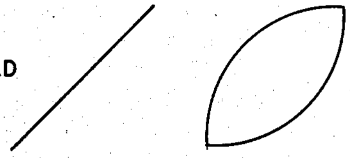
FIG. 5 shows hysteresis loops of the same film after application of a high magnetic field.

In the figures general hysteresis loop forms are shown in both easy and hard directions for both low fields and high fields in the case of FIGS. 1 to 3, and for low fields before application and after application of a high field in FIGS. 4 and 5. The illustrations are general and typical and will vary with different materials. In general low fields are from about 0.5 to 5 oersteds, and high fields are from 8 or 9 oersteds up. A shift in axis for FIGS. 4 and 5 illustrates seven or more cycles of a field of at least 9.3 oersteds. All hysteresis loops are measured on a standard B-H tester.

*Example 1*

A sample of nickel tetracarbonyl vapor which occupies 188 ml. at 133 mm. mercury pressure was mixed with a sample of iron pentacarbonyl vapor which occupies about 700 ml. at 6.2 mm. mercury pressure. The mixture was then diluted with about four times its volume of hydrogen and was passed at a rate of 40 ml. per minute over a metal platform containing circular cover glasses of 9 mm. diameter and .1 mm. thickness, heated to 205° C. After four minutes the stream of hydrogen was interrupted and films were obtained on the cover glasses showing a coercive force in the easy direction of 2.3 oersteds. In the hard direction the coercive force was 1.8 oersteds. With a drive field of 4 oersteds in the hard direction the hysteresis loop was a single line. The film contained between one and two percent carbon.

The drive field in the hard direction was increased to 10 oersteds, and then brought back to 4 oersteds. A loop now appeared identical with the loop in the easy direction at a 4 oersted drive field. When the film was turned 90° this drive field showed a single line. Thus the easy and hard directions had been completely reversed.

The variability of the axis of the film was also demonstrated by rotating the film quickly in its plane by 90° while applying a 10 oersted drive field. The hysteresis loop on the oscilloscope expands momentarily and in a few seconds falls back to the same size it had before rotation of the film.

*Example 2*

267 parts of vacuum sublimed nickel acetylacetonate, 100 parts of vacuum sublimed ferric acetylacetonate were dissolved in 2500 parts of benzene. One-fifth of the solution was then charged into a glass vessel, and a stream of purified hydrogen was passed through for 30 minutes until most of the benzene had evaporated and crystals of the mixed metal acetylacetonates had formed. The chamber was then heated to 150° C. which vaporized the metal acetylacetonates, and these vapors with traces of benzene vapor were carried in a stream of hydrogen into a chamber on which circular cover glasses were carried on a stainless steel platform which was heated to 390° C. The metal acetylacetonates were decomposed and formed a metal film on the cover glasses. After fifteen minutes the stream of hydrogen was interrupted and the platform cooled down to room temperature. The films produced showed the same variable axis as in Example 1.

*Example 3*

A thin film of nickel iron alloy of the same proportion as in the preceding example was formed on substrates. Benzene vapors or methane were then passed over the films which were heated to various temperatures between 200 and 350° C. Carbonizing took place and in each case the film showed variable axis. Below 150° C. no variable axis films were produced and the carbon content was below 0.5 percent.

*Example 4*

A stream of hydrogen of about 6 ml./minute was saturated at 25° C. with nickel tetracarbonyl vapor by passing it through a flask of boiling nickel tetracarbonyl and through a reflux condenser kept at 25° C. Similarly a stream of hydrogen of about 520 ml./min. was saturated at 25° C. with iron pentacarbonyl vapor. The two streams of hydrogen were thoroughly mixed and 350 ml. of the mixture was passed in four minutes at a steady rate through a vessel which contained a rotating circular metal platform on which a number of circular cover glasses were mounted. The cover glasses were kept at 200° C. Films were formed on the glasses but they did not show variable threshold. The time was increased to forty minutes and the films thus formed were tested for threshold variation. Before application of a strong field pulse the threshold value in the easy direction was 1.4 oersteds. After a magnetic field pulse of 6 oersteds had been applied parallel to the easy direction of the film the threshold rose to 2.5 oersteds.

*Example 5*

A number of nickel iron films were prepared in four minutes plating time as described in Example 4, but a stream of 2 ml./min. of ammonia was added to the plating mixture. Variable axis films were produced even at 200° C. with coercivity of 33 oersteds in the hard direction and 31 oersteds in the easy direction.

*Example 6*

The procedure of Example 4 was repeated but simultaneously a stream of hydrogen saturated with molybdenum hexacarbonyl at 25° C. was added at the rate of 150 ml./min. The plating took fifteen minutes and films were formed having 75.7 percent nickel, 20.5 percent iron and the balance molybdenum. The coercive force in the easy direction was 28 oersteds, and in the hard direction 25 oersteds, and the films showed variable axis as described in conjunction with Example 1.

*Example 7*

A thin nickel-iron film of about 80 percent nickel content was plated on gold electrolytically by the normal methods. The film had a coercive force of 5.4 oersteds in the easy direction and 4.2 oersteds in the hard direction. The easy or hard directions could not be changed by application of moderate magnetic fields up to 100 oersteds at room temperature.

The film was heated to 400° C. in methane for 30 minutes and then cooled to room temperature.

The coercive force of the film after this treatment was 30 oersteds in the easy direction and 25 oersteds in the hard direction. The easy and hard directions could be changed as described in detail in Example 1 by intermediate application of a field of 50 oersteds or more.

The terms "easy" and "hard" directions of magnetization are used throughout the specification and claims in their ordinary meaning in the art, that is to say directions in which moderate magnetic fields when applied and removed produce hysteresis loops when applied in the easy direction and produce no hysteresis loops or extremely thin ones in the hard direction.

I claim:

1. A thin film of a nickel-iron base magnetic alloy of a thickness of 500 to 10,000 A. and containing more than 0.5% and not more than 4.5% of an interstitial element selected from the group consisting of carbon, nitrogen, boron, phosphorus and sulphur, said film being partly anisotropic and changing easy and hard directions at room temperature on application of a high magnetic field.

2. A variable axis magnetic film according to claim 1 in which the interstitial element comprises carbon.

3. A variable axis thin film according to claim 1 in which the interstitial element comprises nitrogen.

4. A magnetic film according to claim 1 having a variable threshold of magnetization, the threshold being increased by application of a pulse of a high magnetic field.

5. A magnetic film according to claim 2 having a variable threshold of magnetization, the threshold being increased by application of a pulse of a high magnetic field.

6. A magnetic film according to claim 3 having a variable threshold of magnetization, threshold being increased by application of a pulse of a high magnetic field.

7. A thin film of a nickel-iron base magnetic alloy of a thickness of 500 to 10,000 A. and containing more than 0.5% and not more than 4.5% of an interstitial element selected from the group consisting of carbon, nitrogen, boron, phosphorus and sulphur, said film being partly anisotropic and having a variable threshold of magnetization, the threshold being increased by application of a pulse of a high magnetic field.

8. A magnetic film according to claim 7 in which the interstitial element comprises carbon.

9. A magnetic film according to claim 7 in which the interstitial element comprises nitrogen.

References Cited in the file of this patent

UNITED STATES PATENTS

| | | |
|---|---|---|
| 2,041,480 | Oexmann | May 19, 1936 |
| 2,631,118 | Boothby et al. | Mar. 10, 1953 |
| 2,853,402 | Blois | Sept. 23, 1958 |
| 2,881,094 | Hoover | Apr. 7, 1959 |
| 2,914,393 | Beller | Nov. 24, 1959 |
| 2,919,207 | Scholzel | Dec. 29, 1959 |